(12) United States Patent
Wein et al.

(10) Patent No.: US 8,422,013 B2
(45) Date of Patent: Apr. 16, 2013

(54) OPTICAL MULTIPLEXER/DEMULTIPLEXER

(75) Inventors: Steven J. Wein, Sudbury, MA (US); James D. Targove, Lunenburg, MA (US); David J. Korwan, Westford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 341 days.

(21) Appl. No.: 12/812,615

(22) PCT Filed: Nov. 10, 2009

(86) PCT No.: PCT/US2009/063870
§ 371 (c)(1), (2), (4) Date: Jul. 13, 2010

(87) PCT Pub. No.: WO2010/056668
PCT Pub. Date: May 20, 2010

(65) Prior Publication Data
US 2010/0296091 A1 Nov. 25, 2010

Related U.S. Application Data

(60) Provisional application No. 61/113,377, filed on Nov. 11, 2008.

(51) Int. Cl.
*G01J 3/18* (2006.01)
*G02B 6/34* (2006.01)

(52) U.S. Cl.
USPC .............................. 356/334; 356/328; 385/37

(58) Field of Classification Search .................. 356/331, 356/332, 333, 334, 328; 385/37, 24, 16, 385/17, 18
See application file for complete search history.

(56) References Cited

U.S. PATENT DOCUMENTS

| | | | |
|---|---|---|---|
| 4,752,130 A * | 6/1988 | George et al. ................ 356/334 |
| 5,078,495 A * | 1/1992 | Harada et al. ................ 356/334 |
| 5,192,981 A * | 3/1993 | Slutter et al. ................ 356/334 |
| 5,285,320 A | 2/1994 | Hohberg | |
| 5,424,789 A | 6/1995 | Volk | |
| 5,682,397 A | 10/1997 | Scheps | |
| 6,023,330 A * | 2/2000 | Marshall et al. .............. 356/328 |
| 6,166,805 A * | 12/2000 | Mori et al. .................... 356/334 |
| 6,268,963 B1 | 7/2001 | Akiyama | |
| 6,549,280 B2 * | 4/2003 | Riccardo et al. .............. 356/326 |
| 6,597,452 B1 | 7/2003 | Jiang et al. | |
| 6,744,506 B2 * | 6/2004 | Kaneko et al. ................ 356/328 |
| 6,765,724 B1 | 7/2004 | Kramer | |
| 6,906,798 B2 * | 6/2005 | Kojima et al. ................ 356/334 |
| 7,397,980 B2 * | 7/2008 | Frisken .......................... 385/24 |
| 2002/0027703 A1 | 3/2002 | Kinoshita et al. | |
| 2003/0011769 A1 | 1/2003 | Rakuljic et al. | |
| 2003/0035085 A1 | 2/2003 | Westort et al. | |
| 2003/0047665 A1 | 3/2003 | Livermore et al. | |
| 2003/0076594 A1 * | 4/2003 | Kramer .......................... 359/569 |
| 2003/0174329 A1 | 9/2003 | Kuper et al. | |

(Continued)

*Primary Examiner* — Sang Nguyen
(74) *Attorney, Agent, or Firm* — Robert K. Tendler; Daniel J. Long

(57) ABSTRACT

An apparatus for optical spectrometry utilizes a simplified construction, reducing the number of independent optical elements needed while providing a sizeable dispersed spectrum. The apparatus provides a spectral intensity distribution of an input source wherein individual spectral components in the source can be measured and, in some embodiments, can be manipulated or filtered.

13 Claims, 7 Drawing Sheets

U.S. PATENT DOCUMENTS

| | | |
|---|---|---|
| 2004/0109164 A1 | 6/2004 | Horii et al. |
| 2004/0130774 A1 | 7/2004 | Giles et al. |
| 2004/0208543 A1 | 10/2004 | Weingarten |
| 2005/0100277 A1* | 5/2005 | Frisken .................. 385/37 |
| 2006/0038997 A1* | 2/2006 | Julian et al. ............ 356/328 |
| 2007/0104418 A1 | 5/2007 | McGuire et al. |
| 2008/0007729 A1 | 1/2008 | Hagler |
| 2008/0037089 A1 | 2/2008 | Klausner et al. |
| 2009/0091754 A1* | 4/2009 | Zhang .................... 356/326 |

* cited by examiner

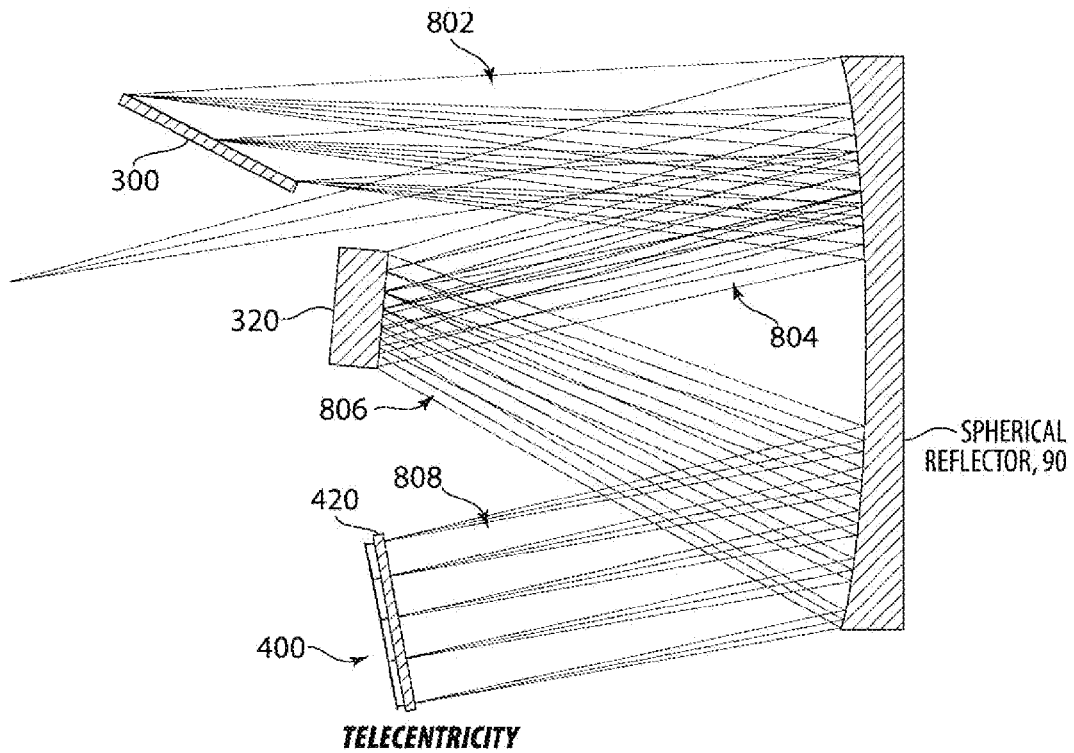
Fig. 6 TELECENTRICITY
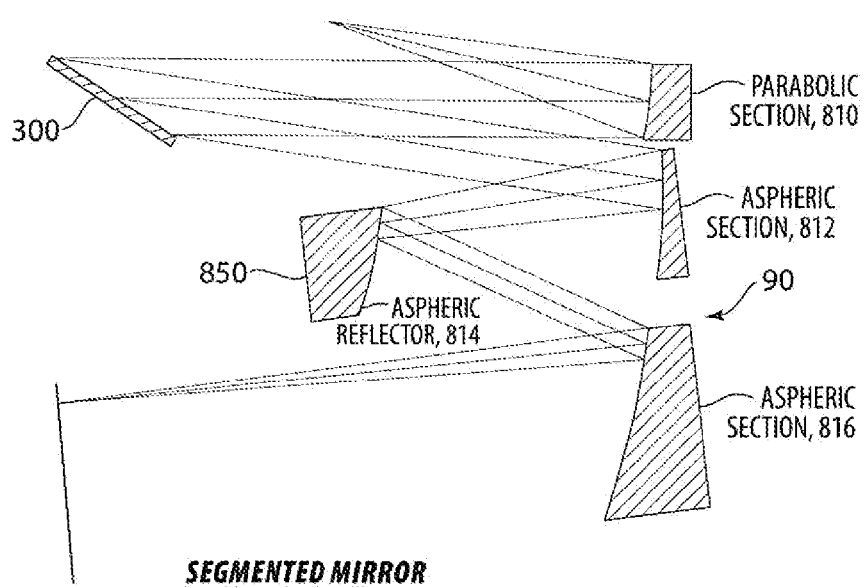
Fig. 7 SEGMENTED MIRROR CONFIGURATION

OPTICAL MULTIPLEXER/DEMULTIPLEXER

RELATED APPLICATIONS

This application claims rights under 35 USC §119(e) from U.S. application Ser. No. 61/113,377 filed Nov. 11, 2008, the contents of which are incorporated herein by reference.

FIELD OF THE INVENTION

This invention relates to optical multiplexers and demultiplexers and more particularly to a compact optical multiplexer/demultiplexer for multiplexing and demultiplexing beams of light having different wavelengths or frequencies.

BACKGROUND OF THE INVENTION

There is a common problem in telecommunications in which optical fibers have multiple communications channels embedded in it in terms of different colors of light which are transmitting different streams of information. One of the problems is to split out these channels so that they can be separately processed, for instance to adjust intensity, polarization and dispersion or color spread.

It is also often important in optical communications to be able to modify each of the individual wavelengths of light differently and then be able to combine the processed channels so as to recombine them back into a single fiber. Thus, it is important to break out from a single fiber the individual spatial components, to process them and to inject them back into a single fiber.

While the telecommunications problem described above is important, it is also important to be able to use such a multiplexer for instance to be able to generate high energy laser beams. Presently fiber lasers exist which can produce hundreds of watts of light within an individual glass fiber. Unfortunately, these intensity levels are not enough for some military and industrial applications. The problem then becomes how to be able to utilize fiber lasers and to provide a combined output to be able to dramatically increase the energy delivered by the system.

There is also a problem with respect to infrared laser countermeasure devices in which laser beams modulated to countermeasure for instance an incoming missile, require a considerable amount of energy on target to be able to robustly provide the countermeasuring function.

One type of laser used in infrared countermeasures is the so-called quantum cascade or semiconductor laser. It is highly desirable for these applications to achieve higher laser powers in a low-divergence beam. It is therefore important to be able to augment or combine semiconductor laser outputs to provide for instance a 10 watt modulated beam on target.

Up to this juncture, there has been no effective way to combine the outputs of fiber lasers or semiconductor lasers to be able to significantly increase the power emitted in a laser beam.

Moreover, it is important in the military context to be able to provide the power amplification modules in a sufficiently small form, to be able to be for instance carried by a missile, carried in a DIRCM head on the belly of an aircraft, or to provide small enough packaging to be able to be readily used in any applications where space is at a premium.

By way of further background, optical multiplexer/demultiplexers are optical instruments that separate out the wavelength spectral components contained in a single input light source. Operated in reverse, the same instrument combines multiple light sources of single color light into a single output beam. In other terminology, a optical multiplexer/demultiplexer demultiplexes the wavelengths in the forward direction and multiplexes the several beams in the reverse direction. In the field of fiber optics communication, for example, the communication bandwidth of a single fiber has been greatly increased using wavelength division multiplexing, or WDM, techniques. Similarly, the measurement and control the properties of individual wavelengths propagating in the fiber, which is critical to the performance and operation of these WDM systems, is performed by demultiplexing the wavelengths into individual control channels.

Grating based optical multiplexer/demultiplexers are generally made up of five functional components; an input point source or linear slit, a collimating optic, the grating, an imaging optic, and one or more receiving components in the output image. When operated as a multiplexer, the one or more receiving components are replaced by narrowband light sources and the input source is replaced by a single receiving component.

Light emerging from the input source is collimated by the collimating optic so that a planar wavefront impinges on the (plane) grating. The grating breaks the single input beam up into multiple beams, with each wavelength propagating in a unique direction. The imaging optic collects these diffracted beams and focuses them into spots at an output plane, where each spot corresponds to a wavelength in the source. The spot corresponding to any single wavelength has finite size, said size primarily being a function of the optical system and the grating. Operated as a multiplexer, the multiple narrowband sources (fiber laser outputs, for example) are positioned in the "output" plane at positions that correspond to their central wavelengths. The imaging optic now functions as a collimator, bringing the multiple wavelength collimated beams together on the grating, impinging on the grating at a angle determined by the location of the source in the output plane. The grating redirects each beam through a unique angle, which angle ideally brings each beam to be coaxial with all the other beams. Finally the collimating optic brings all the parallel collimated beams into a common focal spot at which is located a receiving element.

One object of the present invention is to simplify the optical configuration of optical multiplexer/demultiplexers by reducing the number of independent optical elements needed. It is another object of this invention to provide a physically large output spectral field while maintaining a compact, easy to package form factor. Yet another object of this invention is to provide a optical multiplexer/demultiplexer using a grating in a near-Littrow configuration.

In an alternative configuration, it is an object of this invention to provide improved spectral resolution using only spherical reflective optics.

In another configuration, it is an object of this invention to provide wavelength multiplexer in which multiple independent light sources can be combined into a single coincident output beam.

In yet another configuration it is an object of this invention to provide a region of space in which individual spectral components from the source are physically accessible.

A further object of this configuration is to enable the manipulation or filtering of individual spectral components.

Yet another object of this invention is to recombine filtered spectral components back into a single beam similar in form to the source.

It is a still further object of the subject invention to provide a compact optical multiplexer/demultiplexer for use as a multiplexer/demultiplexer in a telecommunications mode and to be able to combine laser beams of different wavelengths or frequencies to provide highly intense laser beams.

SUMMARY OF INVENTION

The present invention relates to an apparatus and method for spectrally multiplexing and demultiplexing beams of light. More specifically the invention relates to multiplexing or demultiplexing beams of light of different wavelengths or frequencies from multiple light sources, typically fiber lasers. This permits various applications both in telecommunications and in combining laser outputs having different frequencies to provide a high energy combined beam both as a weapon and for countermeasure purposes.

In this invention, compact optical multiplexer/demultiplexer is created using two spherical, reflective optical elements in combination with a diffraction grating operating in a near Littrow configuration to permit light to come in and go out from a common input direction. The telecentricity of the optical design in the conjugate space to the input fiber also permits use of parallel optical fibers to input and output light as opposed to orienting individual fibers in different directions depending on wavelength or frequency.

In one embodiment, a source of light such as an optical fiber is placed at the focus of a collimator. The collimator collimates the light and directs it to the grating. The dispersed light from the grating is collected by the imaging optics and focused into the output plane.

The pair of reflective optical elements is used as both the collimator and the imaging optics for the optical multiplexer/demultiplexer and results in a compact design making the focal length minimized over a single lens system for instance involving a 3+ foot round-trip optical path within a compact 6×8 inch optical footprint. One reflector is a multisection device having a parabolic collimator surface at its outer edge to collimate light towards a grating. Next to the collimator is a reflective object on the multisection deflector to reflect refracted light from the grating to an imaging optic. Light from this imaging optic is reflected by another section of the multisection reflector to an output plane. Thus what is provided is a optical multiplexer/demultiplexer with only two reflective elements.

The two elements operating as the imager act as a telephoto lens, viz., have a physical back focal distance shorter than the optical focal length. A third, refractive element, located near the source, can optionally be added to change the input F-number and provide partial compensation for residual spherical aberrations in the optical system. The output of the optical multiplexer/demultiplexer is a continuous distribution of light in which the spectral distribution of energy in the source is mapped into spatial location.

Note that although this invention has application for multiplexing as well as demultiplexing light beams, for clarity and brevity the names for the optical elements throughout this specification will relate to the demultiplexing application. The collimator is the only optical element between the source and the grating but the imaging optics comprise two elements—a region of the collimator and a second reflective optic.

In another configuration the optical multiplexer/demultiplexer apparatus can be configured to multiplex multiple narrowband fiber sources positioned in the output plane at precise locations determined by their wavelengths.

In a third configuration, the optical multiplexer/demultiplexer can be used to demultiplex (separate), manipulate individually, and multiplex (recombine) into one beam the various spectral components in the source. In this application the distributed image at the output of the optical multiplexer/demultiplexer is directed through a multi-channel filtering (or manipulating) element. The filtered light is then redirected back into the optical multiplexer/demultiplexer, each spectral component generally parallel to itself, so that the optical multiplexer/demultiplexer acting in reverse, now recombines the disparate spectral components into a single beam. The single beam is formed in the input plane, displaced laterally from the input aperture.

BRIEF DESCRIPTION OF THE DRAWINGS

These and other features of the subject invention will be better understood in connection with the Detailed Description, in conjunction with the Drawings, of which:

FIG. 6 is an optical design diagram of a preferred embodiment of the demultiplexer of FIG. 4A shoving the parallel focused multispectral beams impinging on the output plane to establish telecentricity;

FIG. 7 is the optical design diagram of an alternative embodiment of the demultiplexer of FIG. 4A showing a segmented reflective optical element having a parabolic section for collimating light onto the grating and aspheric focusing elements;

DETAILED DESCRIPTION

As will be discussed, a spectrometer operating at Littrow will spread out the various wavelengths in a much shorter distance as compared with conventional non-Littrow spectrometers. While one can go far enough away from a grating to establish sufficient color separation, the length of the device is prohibitive in many applications. Optics associated with such gratings are said to have a focal length dependant on color separation often in excess of one meter. A key advantage to the subject multiplexer/demultiplexer operating at Littrow is that the color separation is so great, the effective focal length can be reduced substantially to inches, making the subject multiplexer/demultiplexer device exceptionally compact.

Operation at Littrow refers to the directions of the collimated beams of the grating and the general direction of the diffracted light being equal. To the extent that these directions are nearly the same establishes the greater dispersion angle and the ability to make the device compact.

More specifically, the importance of the Littrow configuration is that it is the entire purpose of the diffraction grating to split colors of light into different output angles. If all the light comes in in one direction, and if all the colors come in collimated with a single angle of incidence, the grating will split them into a rainbow in which each color comes off at a different angle. The degree of angular spread between the beams coming off of the grating creates dispersion. In general, to minimize the size, and expense of optical multiplexer/demultiplexers, one seeks as maximize the dispersion of the diffraction grating in the utilized geometry.

If one uses a diffraction grating at Littrow with the diffracted angle equal to the indident angle, one also maximizes the dispersion of light. The spread is greatest if one is running near a Littrow configuration Generally in order to get the beams in and out of the grating with multiple colors one must to a certain extent move to a near-Littrow configuration.

Several different collimating/imaging optic configurations have been developed over the years to maximize performance while optimizing other figures of merit. For example, the Ebert-Fastie configuration shown in FIG. 1 uses a single spherical mirror 10 as both collimator and imager, optimizing cost. Here a diverging beam through an entrance slit 12 is collimated by mirror 10 onto grating 16. The diffracted light from grating 16 is focused by mirror 10 out through exit slit 14. This configuration is a non-Littrow configuration and suffers from significant optical aberrations because the single optic must be used significantly off-axis.

Figure 1:
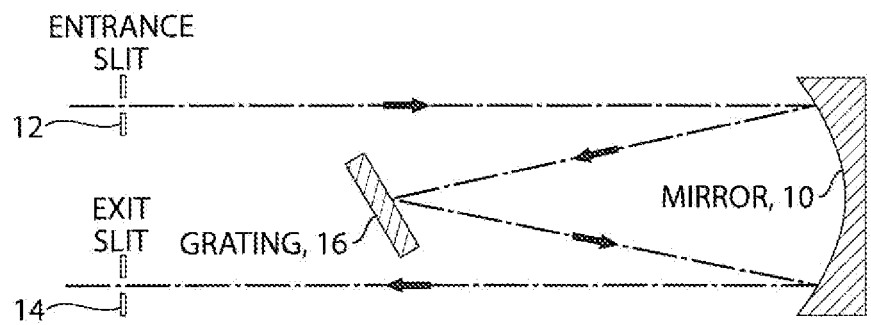
FIG. 1 shows a prior art optical multiplexer/demultiplexer in the Ebert-Fastie configuration.

It is noted that in the prior art device of FIG. 1, a common mirror 10 has a spherical surface in which light which is effectively a point source or a line source, is diverging and is required to be collimated effectively by that mirror. A spherical mirror does not collimate a beam well. One therefore needs a parabolic mirror for a single mirror to give a very high quality collimated beam.

Figure 2:
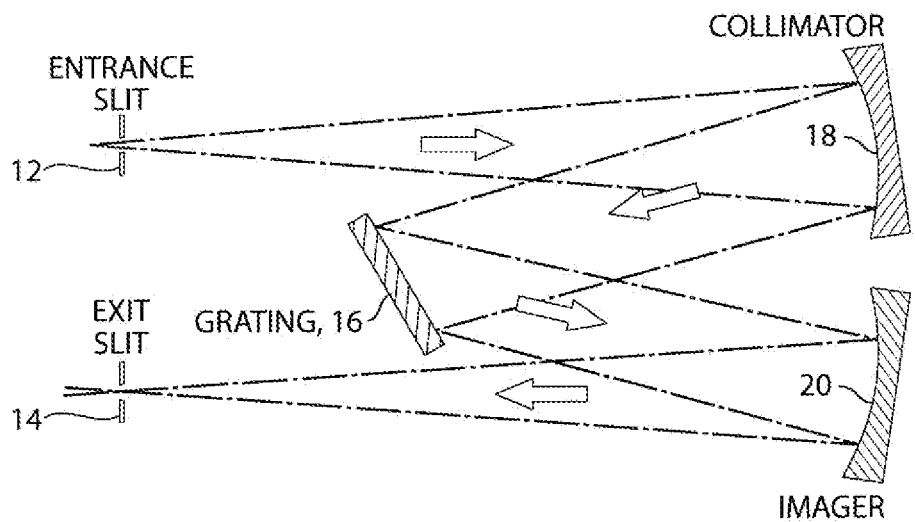
FIG. 2 shows a prior art optical multiplexer/demultiplexer in the Czerny-Turner configuration.

Referring to FIG. 2, a Czerny-Turner configuration is shown in which spherical mirror 10 of FIG. 1 is broken up into two separate mirrors, a collimator mirror 18 and a imaging mirror 20 which again provides a non-Littrow configuration. The choice of the shape of these mirrors is optimized so that one can optimize the collimating mirror to give a high quality collimated beam incident on grating 16. On the other hand imaging mirror 20 collimates the beam from the grating out through exit slit 14, with the two mirrors being oriented in the right directions to give the best performance out of the two elements.

While there is a certain amount of performance that one can achieve out of these two elements, the optical multiplexer/demultiplexer formed thereby is exceedingly large due to the non-Littrow operation.

Note, the Czerny-Turner configuration shown in FIG. 2, uses two independent spherical optics for the collimator and imager. This configuration is more expensive but has lower aberrations.

Optical Multiplexer/Demultiplexer Applications

Figure 3A:
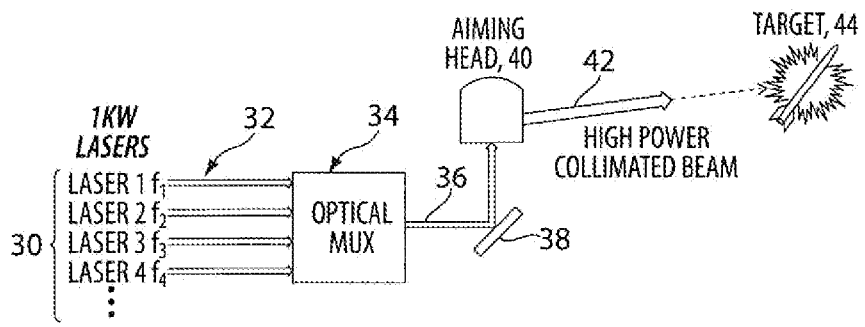
FIGS. 3A, 3B, and 3C show applications of the compact optical multiplexer/demultiplexer functioning either as a multiplexer for fiber lasers to provide a high power collimated beam, to combine the modulated outputs of semiconductor milliwatt lasers to provide a modulated high power infrared countermeasure beam and to provide a multiplexer/demultiplexer module for correcting the individual color channels in a single fiber input beam to process the individual color channels and to output corrected color channels ported to a single output fiber.
Figure 3B:
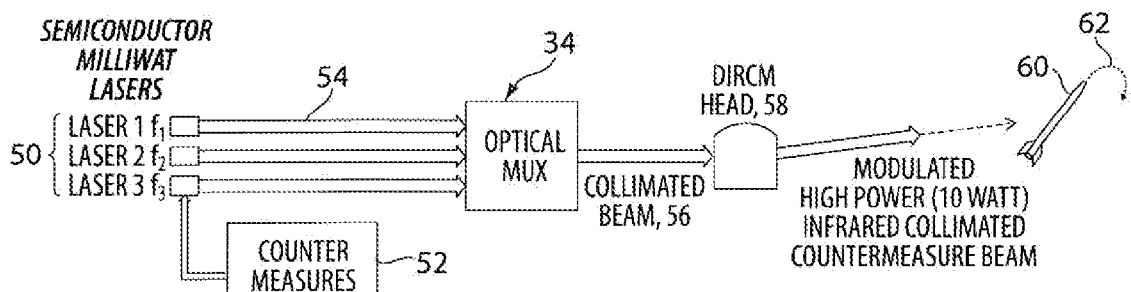
Figure 3C:
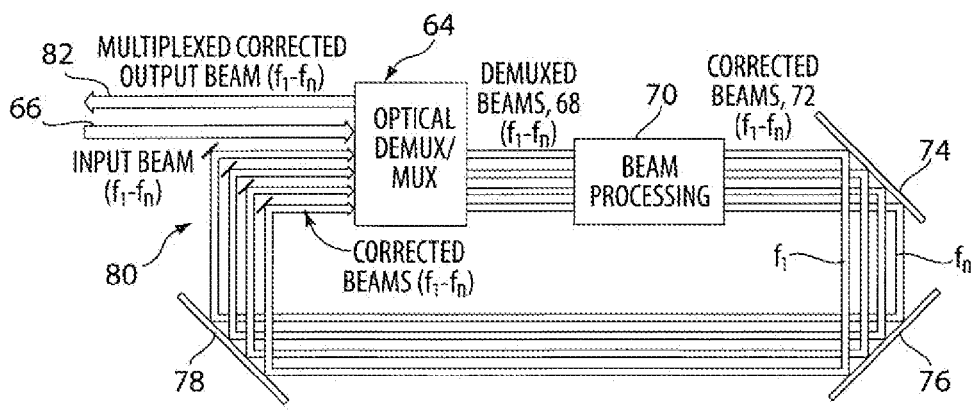

Referring now to FIGS. 3A, 3B and 3C, shown are a number of applications for the subject optical multiplexer/demultiplexer operating either as an optical multiplexer or a combined optical demultiplexer and multiplexer.

It is the purpose of the subject optical multiplexer/demultiplexer, to multiplex or combine laser inputs of a number of colors, frequencies or wavelengths and combine them into an output beam in which the energy in the output beam is, to a first approximation, the sum of the energies in the input beams. What the subject optical multiplexer/demultiplexer is able to accomplish is to be able to provide high or low power collimated output beams than that achievable with individual lasers that do not provide an adequate laser power for a given application.

Nowhere is this more important than the utilization of fiber lasers which in general are capable of high output powers of hundreds of watts, or higher. It is important to be able to combine the outputs of these lasers and sum them in a way to produce a much higher output collimated beam.

To this end and as shown in FIG. 3A, a number of fiber lasers 30, each operating at a different color or frequency have their beams 32 applied to an optical multiplexing device 34, the purpose of which is to take the separately colored laser beams and combine them into a collimated high energy beam 36 which, is redirected for instance by a mirror 38 to an aiming head 40 which aims the beam 42 towards a target 44 to be able to destroy the target or at least a portion thereof. The wavelengths of the individual lasers are chosen appropriate) to allow the optical multiplexing device 34 to combine them into a coboresighted output beam.

It will be appreciated that there is a limit to the power output of a single fiber laser, and while these fiber lasers are efficient providers of collimated light, it is important to have methods to provide for the high intensity beams required in certain military applications.

Referring to FIG. 3B it is also possible in an infrared countermeasure system to provide semiconductor milliwatt lasers 50 which are modulated by an optical modulation 52 to provide modulated differently colored beams 54 towards the same type of optical multiplexer that is shown by reference character 34 in FIG. 3A.

Here, the output is a modulated collimated beam 56 which is directed by a directed infrared countermeasure (DIRCM) head 58 towards a target 60, with the modulated radiation causing the seeker in the missile head of missile 60 to direct the missile away from its intended target as illustrated by dotted arrow 62.

The above shows a system by which lasers of different colors can have their outputs combined to provide a collimated beam which is highly intense and is the sum of the output powers of the input lasers.

Referring now to FIG. 3C, the subject optical multiplexer/demultiplexer may be utilized as both a multiplexer and a demultiplexer without alteration of its optical components. Here an optical multiplexer/demultiplexer 64 is provided to take an input beam 66 constituting the output from a single fiber carrying different colored channels.

It is the purpose of the optical demultiplexer in one mode is to couple a number of demultiplexed beams 68 to a beam processing unit 70, the purpose of which is to alter the characteristics of the individual beams to correct for intensity, polarization and dispersion or color spread. Such processors are known and include for instance the processors described in published US Patent Applications 2003/0067641 and 2002/0176645, incorporated herein by reference. The corrected or processed beams 72 comprising beams of different frequencies are redirected by mirrors 74, 76, 78 and 80 back into the self-same optical device, namely optical multiplexer/demultiplexer 64.

Using the same optical elements and configuration, the corrected beams, each of a different color, are combined by the multiplexer action of multiplexer/demultiplexer 64 such that they are recombined into a single collimated beam 82 which may be coupled to a single optical fiber, with the characteristics of the individual beams corrected.

Thus as can be seen, the subject optical multiplexer/demultiplexer can be utilized in applications where beams of multiple colors are to be combined, and wherein beams having information carried in multiple colors may be separated out for processing, followed by multiplexing back into a single beam.

Figure 4A:
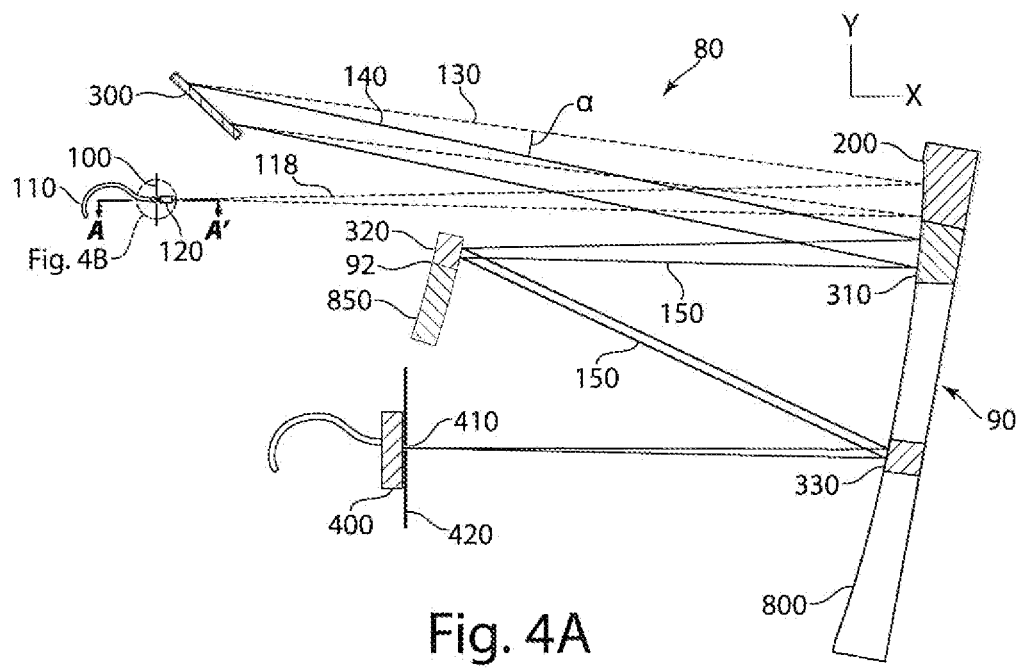
FIGS. 4A and 4B are schematic diagrams of a demultiplexer embodiment of the invention as laid out in the x-y plane, with 4B showing details of the entrance aperture region.

As to the optical multiplexer/demultiplexer design, and referring to FIG. 4A, a optical multiplexer/demultiplexer 80 has essentially two reflective elements 90 and 92.

Reflective element 90 collimates the diverging light from fiber 100, with a portion 200 of reflective element 90 directing the collimated beam towards a grating 300.

Grating 300 disperses the incident beam and returns the diffracted beam as illustrated at 140 to a reflective surface 310 of reflector 90.

As will be described, the narrow angle α between the input and output beams to and from the grating is what makes the system near-Littrow, since the collimated incoming beam 130 incident in one direction is almost in the same direction as the outgoing dispersion 140.

The diffracted energy from grating 300 is focused by a combination of reflective surfaces 310, 320, and 330, which focuses the energy onto a focal plane 420 at focal point 410.

The result is that the overall focal length of the device itself is kept quite short as mentioned above. Also important is the fact that the system operates in a near Littrow configuration. Additionally, the image space chief rays for the various input wavelengths are parallel, a characteristic commonly referred to as telecentricity. The optical system formed by reflective elements 90 and 92 must be properly designed with respect to the spectrally dispersed beam diffracted by grating 300 to support the telecentricity condition.

In a typical nontelecentric optical system, the image space chief rays for separate wavelength channels would not be parallel, greatly complicating coupling of these focused beams into individual fibers. For example a telecentric optical system allows the individual output fibers to be aligned in parallel in a v-groove assembly which captures all of the fibers in parallel tracks. In addition, parallel optical processing of the individual spectral channels by common optical processors typically requires the individual spectral channels to be optically parallel.

Thus not only does the subject system separate the beams out spatially, it also produces parallel beams at the output to greatly simplify detection and processing.

Since the system described above for the optical multiplexer/demultiplexer is near-Littrow, the spectral dispersion of incoming light is magnified, thereby to provide significant spatial separation on the focal plane for the various colors of light involved.

Demultiplexer Configuration

Referring again to FIG. 4A, this shows a schematic diagram of the compact optical multiplexer/demultiplexer 80 in the x-y plane, i.e., the plane containing the optical axes of the various optical elements, in the region of the entrance aperture. The z, or vertical, axis is pointed up out of the plane of the figure. When operated as a demultiplexer, light enters the instrument at the entrance aperture 100. The entrance aperture can be a physical stop or slit but, typically, the entrance aperture is simply the location in space from which the optical multiplexer/demultiplexer optics have been designed to accept light. Preferably, multispectral light 115 is injected at the entrance aperture 100 by a cleaved or lensed optical fiber 110, wherein the core 112 of the fiber represents an unresolved, or point, source to the optical multiplexer/demultiplexer optics. Typically, the fiber core is between 5 and 20 microns in diameter. In a typical optical communications application, the wavelength spectrum of the input, multispectral light 115 spans one or more of the so called C or L bands (typically 1525-1565 nm and 1570-610 nm respectively).

Figure 5:
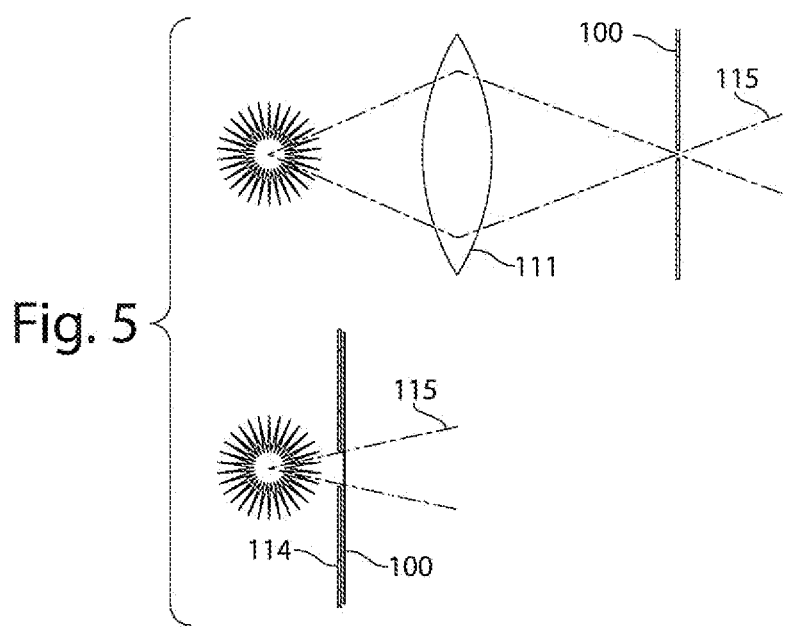
FIG. 5 schematically shows two means for injecting light into the optical multiplexer/demultiplexer of FIG. 4A.

FIG. 5 shows two alternative means for injecting light 115 into optical multiplexer/demultiplexer 80. One alternative means uses an extra focusing lens 111 to form the point source in the entrance aperture 100; while the second alternative uses a simple back-illuminated pinhole 114. In yet another alternative the entrance aperture is generally slit shaped, with the narrow dimension of the slit being comparable to the pinhole or fiber core 112. The long dimension of the slit is oriented parallel to the z-axis of the device illustrated in FIG. 4A.

Figure 4B:
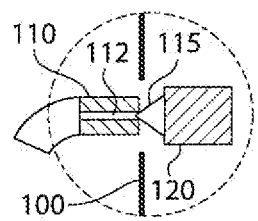

As is well known, light emerging from the core of a cleaved optical fiber is generally radiated into a large angled cone. Capturing all the light in such a cone is typically difficult to accomplish. Thus, as shown in inset FIG. 4B, an interface optic 120 is preferably included in close proximity to input fiber 110 as a means to increase the optical efficiency of the instrument. In one embodiment, interface optic 120 is a positive power, refractive lens. If the tip of the fiber is located within one focal distance of this lens, the light emerging from the exit face of the lens will be a less broad cone. The gap between fiber 110 and interface optic 120 may contain air or epoxy. For the preferred implementation of optical multiplexer/demultiplexer 80, the source fiber radiates light 115 into a cone of numerical aperture (NA) of approximately 0.01 at the 1/e2 intensity and exits interface optic 120 with an NA of approximately 0.022. It will be appreciated that the details of the optical design of this interface optic depend heavily on the choice of input fiber, desired instrument performance and size, and so forth; and that many specific designs for this optic are possible without deviating from the intent of this invention.

Returning again to FIG. 4A, the light exiting interface optic 120 expands in a narrow one 118 as it propagates toward reflector 90 that serves as primary optic 800. Primary optic 800 is a positive power reflective optic. Preferably, for ease of manufacture, the concave, focusing surface of primary optic 800 is substantially a portion of a sphere. Alternatively the focusing surface of primary optic 800 can be a portion of an asphere, as is understood in the field of optical design. The cone of light is directed such that it bypasses a secondary optic 850 and impinges on a small portion 200 of primary optic 800. Portion 200 functions as the collimator for the optical multiplexer/demultiplexer. In the preferred configuration shown in FIG. 4A collimator portion 200 is located at one edge of primary optic 800.

Note, the distance between the plane input aperture 100 and primary optic 800, as measured along the optic's optical axis is substantially the effective focal length of primary optic 800. Light cone 118 is thus substantially collimated by primary optic 800. Additionally, input aperture 100 is located substantially on the optical axis of primary optic 800. However, in other configurations the entrance aperture 100 can be above or below the plane of FIG. 4A. Upon reflection from collimator portion 200, the light propagates generally parallel to the optical axis of primary optic 800, as collimated beam 130, until it reaches the plane diffraction grating 300. The grating is located by standard optical ray tracing methods to intercept collimated beam 130. This position will vary relative to primary optic 800 as a function of the selected location for input aperture 100.

Grating 300 is selected from industry standard designs and can be directly ruled, replicated in epoxy, or made holographically. Preferably, grating 300 is designed to operate in the wavelength band of interest in the so-called Littrow configuration.

The salient characteristic of a Littrow grating, as shown in FIG. 4A, is that the first useful diffracted order propagates generally back toward the direction from which the input beam comes. A preferred form of grating 300 is the echelle grating, in which a coarse-pitched grating is used at a high grating order to achieve large angular dispersion. The demultiplexed outputs for all wavelengths of interest are preferably diffracted from the grating 300 in the same grating diffraction order, with the diffraction grating grooves blazed to maximize diffracted throughput into the utilized diffraction order. An alternative embodiment utilizes high-order echelle gratings with each of a number of discrete demultiplexed wavelengths diffracted into a different diffraction order, all having maximum grating efficiency for a single grating blaze angle.

Grating 300 diffracts beam 130 generally in the backwards direction, with each of the different wavelengths in beam 130 each being diffracted at its specific angle according to the well-known grating equation. The central wavelength in beam 130, when diffracted, becomes collimated return beam 140. In the preferred embodiment, grating 300 is designed according to well-understood principles to operate in a near-Littrow configuration such that collimated return beam 140 propagates back to primary optic 800 at an angle α relative to beam 130. In the preferred embodiment, angle α is less than 10 degrees and typically equal to 4 degrees. As is shown in FIG. 4A, angle α is designed to return beam 140 to primary optic 800 closer to the optical axis than beam 130. That is, beam 140 is coming from larger field angle than beam 130, relative to primary optic 800.

Beam 140 impinges on primary optic 800 in region 310, slightly displaced from region 200. Note, regions 200 and 310 are depicted as non-overlapping for clarity, but may overlap by approximately 50%.

After reflecting from region 310 on primary optic 800, the diffracted light is converted from collimated beam 140 to converging beam 150. Left undisturbed, beam 150 would come to a focus in essentially the same plane as input aperture 100, but displaced downward in FIG. 4A by the effect of angle α. It will be understood by one skilled in the art that beam 150, while referred to in the singular when it represents the beam formed by a single wavelength from the original spectrum of the input light, the single wavelength to be substantially at the center of the operating wavelength band of optical multiplexer/demultiplexer 80, is actually is meant to indicate the continuum of beams propagating in the optical multiplexer/demultiplexer, each wavelength in the source having been uniquely directed by the dispersive nature of grating 300. Each additional wavelength in the source has its own converging cone leaving region 310, with each cone coming to focus in a common output plane 420, thereby forming a dispersed spectrum in that plane.

In optical multiplexer/demultiplexer 80, the one or more beams 150 do not propagate directly to focus. Instead, they are reflected from secondary optic 850 and again by primary optic 800. The converging beams impinge on secondary optic 850 in a small region near its edge, indicated by region 320, and then impinge on primary optic 800 in region 330. Together the three regions 310, 320, and 330 form a long focal length telephoto imaging system that focuses the collimated beam(s) from the grating into a continuous intensity distribution 410 at output plane 420. This represents the spectral content of input light 115. Thus, the invention has demultiplexed a multiple wavelength input beam. In the preferred implementation, the imaging system has an effective focal length of 180 mm and forms an f/23 cone at the distribution 410.

When the optical multiplexer/demultiplexer is used as a demultiplexer, the imaging system formed by primary optic 800 and secondary optic 850 forms a magnified image 410 of the spectrum on the sensitive surface of a detector 400, which has been located in the output plane 420. The detector is preferably selected to respond to the wavelength band of interest. Typically, detector 400 is an array detector composed of multiple independently readable detector elements, although film and spectroscopic plates may also be used. Preferably, the magnification of the imaging system is designed such that the element-to-element spacing in the preferred detector produces the desired spectral sampling. A refractive field lens may be added in proximity to the detector plane to flatten the image field and if desired, to adjust the telecentricity of the spectrograph.

In an alternative configuration, a relay magnification optical system can be located after image 410 to adjust the size of image 410 to match the desired spectral sampling with the element-to-element spacing in the preferred detector. The use of such an image magnification-matching relay is well known in the art.

Returning to FIG. 4A, the preferred optical design for the telephoto imaging system comprising regions 310, 320, and 330 has a back focal length (essentially the distance at which the spectrum 410 is formed) of 17 mm. Since the back focal length is shorter than the effective focal length (180 mm), the imaging system is a telephoto design, providing high magnification in a compact package.

Functionally, the collimator and imaging system optics for this demultiplexer are formed from three independent elements corresponding to regions 200/310, 320, and 330. These three elements, each of which is an eccentric pupil subaperture of a larger parent optical element, must be mounted and aligned relative to each other to form the collimator and imaging systems described above. Preferably, the collimator and imaging system are assembled from the two full-width elements themselves, i.e. primary optic 800 and secondary optic 850. Each of these parent optics is a section of a centered spherical mirror with a diameter determined by the off-axis locations of regions 200 and 320 (for optic 800 and 850 respectively). The manner in which these elements are sectioned are described below. Since these two optical elements are centered, they can be easily mounted and aligned using simple techniques that are well-known in the industry and will be described below as well.

The optical design parameters for the preferred embodiment of the multiplexer/demultiplexer have been determined using commercial optical design software. Table I is the optical design diagram showing the preferred embodiment with the corresponding optical design listing ("the lens prescriptions"). It will be noted by those of skill in the optical design art that the entire system comprises two powered elements, these being reflective spherical optical elements.

TABLE 1

Lens Prescription for 1547 nm Wavelength, NA 0.02 input

| | RDY | THI | | |
|---|---|---|---|---|
| OBJ: | INFINITY | 3.457700 | | |
| STO: | INFINITY | 0.000000 | | |
| 2: | INFINITY | 0.000000 | | |
| 3: | INFINITY | 118.654508 | | |
| XDE: | 0.000000 YDE: | −69.149831 ZDE: | 0.000000 REV | |
| ADE: | 11.514052 BDE: | 0.000000 CDE: | 0.000000 | |
| 4: | −439.64270 | −123.285456 REFL | | |
| SLB: | "M1" | | | |
| 5: | −251.80151 | 123.285456 REFL | | |
| SLB: | "M2" | | | |
| XDE: | 0.000000 YDE: | 7.425031 ZDE: | 0.000000 DAR | |
| ADE: | −4.676107 BDE: | 0.000000 CDE: | 0.000000 | |
| 6: | −439.64270 | 0.000000 REFL | | |
| SLB: | "M3" | | | |
| 7: | INFINITY | 0.000000 | | |
| XDE: | 0.000000 YDE: | −36.860825 ZDE: | 0.000000 REV | |
| ADE: | 4.012577 BDE: | 0.000000 CDE: | 0.000000 | |
| 8: | INFINITY | −169.251359 | | |
| XDE: | 0.000000 YDE: | 36.770465 ZDE: | 0.000000 REV | |
| ADE: | −4.012577 BDE: | 0.000000 CDE: | 0.000000 | |
| 9: | INFINITY | 166.672006 REFL | | |
| SLB: | "GRT" | | | |
| GRT: | | | | |
| GRO: | −22.000000 GRS: | 0.018986 | | |
| GRX: | 0.000000 GRY: | 1.000000 GRZ: | 0.000000 | |
| XDE: | 0.000000 YDE: | 48.643024 ZDE: | 0.000000 DAR | |
| ADE: | 63.577583 BDE: | 0.000000 CDE: | 0.000000 | |
| 10: | −439.64270 | −217.650880 REFL | | |
| SLB: | "COL" | | | |
| IMG: | INFINITY | 0.000000 | | |
| XDE: | 0.000000 YDE: | 13.729200 ZDE: | −0.000000 DAR | |
| ADE: | 11.828300 BDE: | 0.000000 CDE: | 0.000000 | |

As mentioned above and referring now to FIG. 6, it is a feature of the subject invention that the optics involved provide a telescope having telecentricity. As can be seen, spherical reflector 90 collimates light from a point source onto grating 300 which diffracts the multispectral light as illustrated at 802 back towards spherical reflector 90. From there a portion of spherical reflector 90 focuses the incident light onto a reflective element 320 which in turn continues the focusing action and returns the light to another portion of spherical reflector 90, with each of the different colored beams spatially separated.

These spatially separated beams on spherical reflector 90 are again focused to output plane 420 such that individual beams of light 808 of different colors impinge on output plane 420 from the same direction. The arrival of these differently colored beams of light in parallel permit detection by detectors 400 or coupling of the light into respective optical fibers positioned at plane 420 such that the centerlines of these fibers are also parallel one to the other and can therefore line up with the corresponding beams. This alignment is made simple due to the parallelism of beams 808 which can be matched to the parallelism of the optical fibers. This permits the use of the v-channel positioning block of FIG. 13.

Referring to FIG. 7, in certain circumstances a higher performance system may be desired. In such circumstance the design performance limitations of a two element pure spherical system may be improved by removing one or both of those constraints (viz., two element constraint and spherical only constraint). FIG. 7 is the optical design diagram for an embodiment freed from those constraints in which the individual optical surfaces may be a mixture of spherical, conic, or aspheric surfaces, here respectively a parabolic section 810, an aspheric section 812, an aspheric surface 814 for element 850, and an aspheric section 816. What is shown here is a segmented mirror configuration for primary optic 800.

Figure 8:
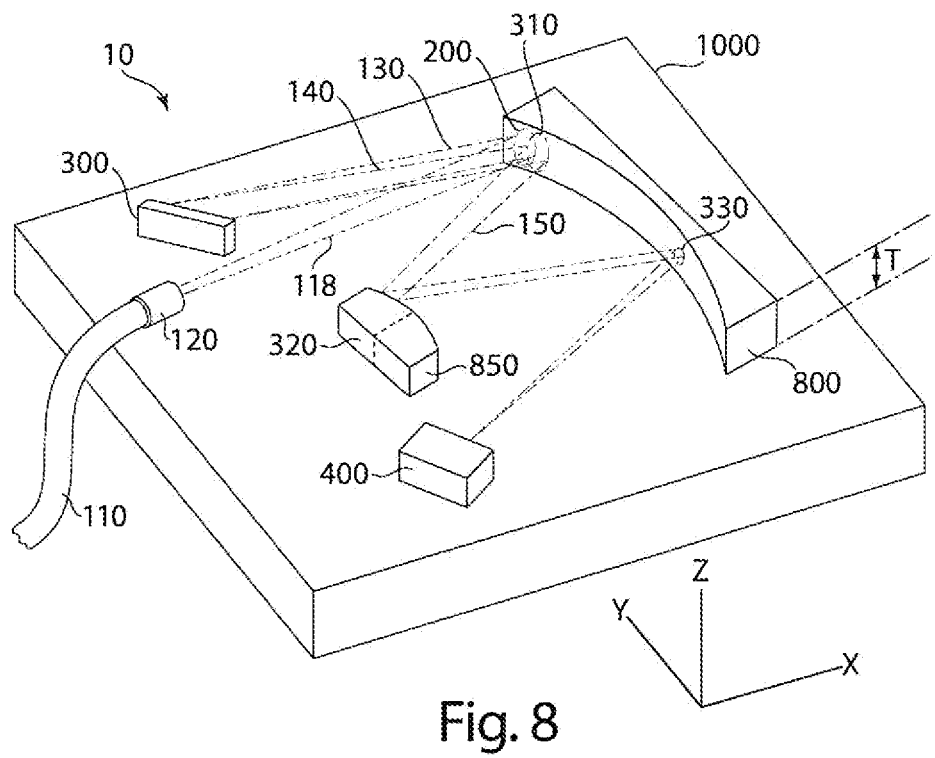
FIG. 8 is a perspective view of a preferred demultiplexer embodiment of the optical multiplexer/demultiplexer.

As shown in FIG. 8, all components of optical multiplexer/demultiplexer 80 are assembled as a compact package, mounted on a unitary base structure 1000 for stability. Each component is preferably mounted using pre-determined reference points, typically miniature dowel pins. Analyses have shown that system performance will not be degraded when said alignment reference points are positioned to within 0.001-0.002 inches, a tolerance well within standard practice in optical assembly technology. Preferably the structure is athermalized. For example, base structure 1000 is preferably manufactured from Zerodur®, a well known substrate material, although fused silica and ULE® glass are acceptable alternatives. Additionally, kinematic or quasi-kinematic mounting configurations are preferred.

Figure 9:
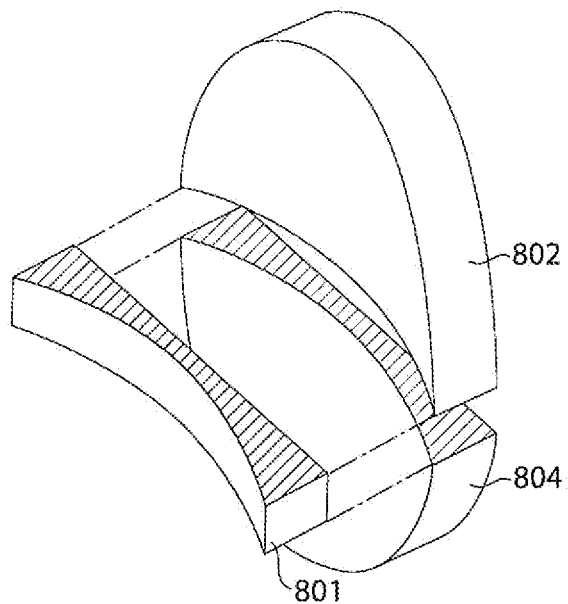
FIG. 9 is a diagrammatic illustration of the spherical surface configuration of the reflective element of FIG. 8.

Referring to FIG. 9, a perspective view of the instrument shows that primary optic 800 and secondary optic 850 preferably implemented as rectangular sections 801 cut from parent optical elements 802 and 804. The thickness, T, of the elements is equal to the clear aperture required for beam 118 when it reaches primary optic 800 plus additional margin for manufacturing, alignment and mounting considerations, as is typically done in optics manufacture. Alternative manufacturing approaches, such as, optical replication, injection molding, or diamond turning are anticipated by the inventors.

Spectral Manipulator Configuration

Another application for the invention is to permit individual and unique manipulation, or filtering, of the various spectral components that make up the light emitted from the source. For example, one might want to equalize the optical energy across the visible spectrum in the light emitted by a blackbody source of known emission temperature. A second preferred configuration of the invention is used for this application. For filtering, the optical multiplexer/demultiplexer is used in a double pass mode. That is, the light is injected into the optical multiplexer/demultiplexer in the input plane, is dispersed passing through the instrument, and is formed into a continuous spectrally dispersed display in output plane 420 as before. However, detector 400 is replaced by other elements that firstly manipulate each component of the spectrum individually and secondly return the light into the optical multiplexer/demultiplexer instrument for a second pass. During this reverse, second pass, the previously spectrally dispersed light is recombined by the aforementioned grating element into a single beam and is refocused into an output point by the optical multiplexer/demultiplexer optics.

The modifications to the invention to accommodate this double pass operation are described with reference to FIGS. 10 and 11.

In an optical multiplexer/demultiplexer configuration, it is desirable to use a single optical multiplexer/demultiplexer 80 to spatially demultiplex the spectral components or channels of an input signal tier some form of optical processing, and to subsequently multiplex the processed light signals back into a single output beam.

Figure 11:
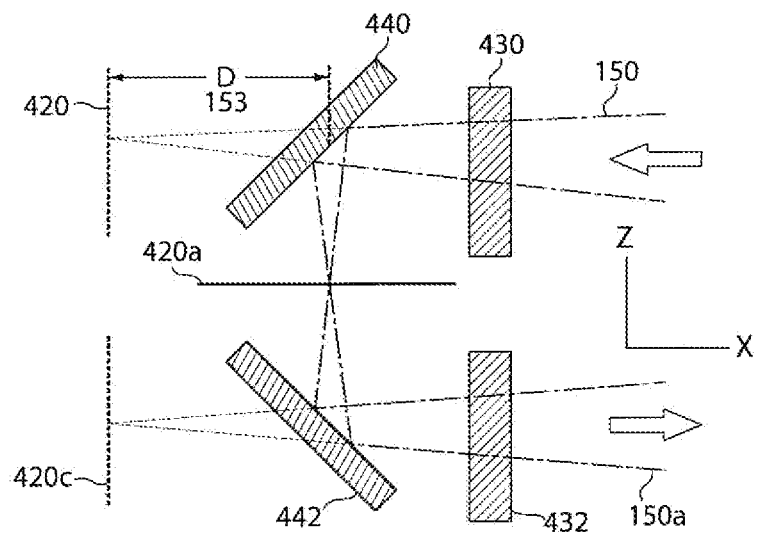
FIG. 11 is a schematic view of the arrangement of optical elements to permit the operation of FIG. 10 by locating these elements in the region around the input aperture of the optical multiplexer/demultiplexer function as a demultiplexer in a plane containing the z-axis in which the optical elements can be configured to permit optical processing such that multispectral light at the output plane an be processed and injected back into the subject optical multiplexer/demultiplexer.

FIG. 11 presents a geometry for the demultiplexed region after the optics in which multiple sequential Spectral Manipulating Elements (SMEs) can be inserted and the light retroreflected appropriately such that the optical multiplexer/demultiplexer 80 will properly multiplex the signals. The retroreflection path illustrated in FIG. 11, when combined with the optical multiplexer/demultiplexer 80 illustrated in FIG. 4A, directs the multiplexed processed output out of the multiplexer/demultiplexer.

Figure 10:
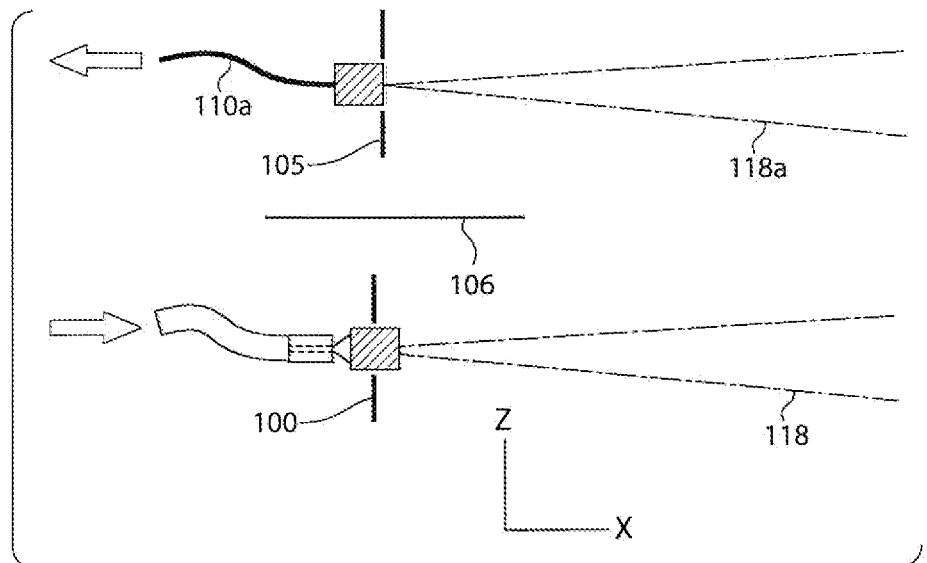
FIG. 10 illustrates how the optical elements may be provided above and below a plane to permit light exiting or entering the device to be conveniently physically displaced so that exiting light can be processed and injected back into the subject multiplexer/demultiplexer.

As shown in FIG. 10, the optical multiplexer/demultiplexer 80 of FIG. 4A may be modified to direct the output beam through an exit aperture 105 and output fiber 110a spatially separated from the entrance aperture 100. FIG. 10 is a view of optical multiplexer/demultiplexer 80 in the plane of cut A-A' in FIG. 4A in the region of the entrance and exit aperture. In this second preferred configuration, entrance aperture 100 is offset out of the plane of 106 FIG. 4A below plane 106. That is, the aperture is displaced in the z-axis direction below plane 106. Exit aperture 105 exists above plane 106 to capture the processed beam. Note, the entrance aperture is shown offset in the negative z-direction (i.e., below the plane of FIG. 4A) although a positive offset is equally preferred. The offset entrance aperture 100 is matched symmetrically by an exit aperture 105 positioned above plane 106, in the z-direction. Multispectral light is introduced into optical multiplexer/demultiplexer 80 as in the prior configuration, shown in FIG. 4A, as expanding cone 118. The propagation of this light through the instrument proceeds as in the prior configuration and exits optical multiplexer/demultiplexer 80 as beam 118a.

FIG. 11 shows the additional elements in the region near output plane 420 required to implement the processing of the dispersed beams from the optical multiplexer/demultiplexer and to allow the spatially separated input and output apertures of FIG. 10. Detector 400 of FIG. 4A is replaced by the combination of one or more spectral manipulation elements (SME) 430, 432, and two broad band reflective surfaces 440, 442. Preferably, surfaces 440, 442 are high reflection optical coatings deposited on optical substrates (viz., front surface mirrors) as is well known in the art, where said coatings have been optimized for reflecting the operational wavelength band of the invention.

As will be appreciated. FIG. 11 is a view of optical multiplexer/demultiplexer 80 in the region of cut B-B' in FIG. 4A. Reflective surfaces 440 and 442 are positioned such that the normals to their respective surfaces are each in the plane formed by the central ray of beam 150 and the z-axis. Additionally, the reflective surfaces 440, 442 are held at a right angle to each other. As is well known in the field of optics, surfaces held in this orientation retroreflect light beams in the plane in which the mirrors are folded. For beams propagating with a component out of aforementioned plane, the in-plane component is retroreflected and the out-of-plane component will be reflected as if the mirror pair were a single mirror (i.e., the angle of reflection equals the angle of incidence).

As shown, first reflective surface 440 is located in front of image plane 420 by displacement distance, D, 153 and oriented at substantially 45 degrees to the direction of propagation of beam 150, with its reflective side facing beam 150. First reflective surface 440 is generally located such that the central ray of beam 150 intercepts surface 440 substantially at its center. Second reflective surface 442 is located at substantially 90 degrees to first surface 440 and also facing the beam 150 and located such that the central ray of beam 150 intercepts its surface substantially at its center. Displacement distance D is substantially equal to one-half the distance between surface 440 and surface 442, as measured along the central ray of beam 150. In this configuration, output plane 420a, the plane containing the optical axes of the optical components, is substantially parallel to beam 150 and located midway between surfaces 440 and 442.

Preferably, light converging toward output plane 420 first passes through SME 430, whose function will be described below. Note that beam 150 is traveling above (z-positive) the plane 420a containing the optical axes of the optical components. The beam is above the axis near output plane 420 because input aperture 100 is located below said plane, as was described above. Similarly, beams 150 would be below this plane had the input aperture been place above the plane.

Beam 150 impinges on surface 440 and is reflected downwards (e.g., generally along a direction parallel to the z-axis) toward surface 442. Output plane 420a is formed mid-way between surfaces 440 and 442, in accordance with the said selection of displacement distance 153. The forward pass of this double pass configuration is complete when beam 150 reaches its focused condition in output plane 420a, wherein a continuous spectral distribution is formed.

As the light passes through focus in output plane 420a it re-expands in defocusing beams 150a as it begins its second pass through the optical multiplexer/demultiplexer 80. The spectral distribution in output plane 420a now serves as the source for the optical multiplexer/demultiplexer. Emerging from output plane 420a (i.e. plane 106 of FIG. 10) beams 150a impinge on reflective surface 442 and are reflected into a plane substantially parallel to, but displaced in the negative z-direction from the plane containing beam(s) 150, with the said displacement being substantially equal to the aforementioned positive displacement of beams 150. The redirected beams are pointed generally back to primary optic 800 and appear to be emerging from a spectral distribution in output plane 420c. The beams diverging from output plane 420c toward primary optic 800 preferably pass first through SME 432, whose function will be described below.

Beams 150a propagate generally back to primary optic 800 until they reach region 330. From region 330 backwards-propagating beams 150a generally retrace the paths taken by forward-propagating beams 150. Beams 150a are generally slightly displaced from their corresponding beams in beams 150, the displacement being in accordance with well understood optical ray tracing analyses and having no significance to the effect of the various optics in optical multiplexer/demultiplexer 80.

When beams 150a reach region 310 they become substantially collimated beams 140a. Beams 140a are in direct correspondence with forward propagating beams 140. Beams 140a impinge on grating 300 at angles of incidence corresponding to their wavelengths and, thus, are rediffracted by grating 300 into a common propagating direction where they are collectively considered a single beam, beam 130a. Beam 130a propagates to region 200 of primary optic 800 where it is focused toward exit aperture 105 as beam 118a. At the exit aperture, the focused beam 118a is typically coupled into an optical fiber and out of the optical multiplexer/demultiplexer 80.

The function of the double pass configuration just discussed is to provide a physical space in which one or more spectral manipulation devices can operate on the various spectral components in the original optical signal independently. That is, if the optical signal traveling in the input optical fiber is composed of light at two distinct wavelengths, say 1540 nm and 1550 nm, it is the purpose of this invention to allow one optical adjustment to be applied to the 1540 mm light and a separate and independent adjustment to be applied to the 1550 nm light. For example, it may be desirable to attenuate the 1550 nm light by 10% without affecting the 1540 nm light in order to equalize the optical power in the two wavelengths.

In FIG. 11, the preferred configuration, in which two SMEs are installed, is illustrated. Alternatively, a single SME could be used alone, positioned in the location of either SME 430 or 432 or in the output plane 420 located between the reflective elements 440,442. A further alternative configuration would permit three SME's to be used, with one SME in plane 420 and one each corresponding to SME 430 and 432.

Preferably, the SME's are located close to output plane 420, said plane being the location at which the various spectral components are most distinct. However, exact positioning in this plane is not required since the spectral manipulation performed by the SME's are always of finite spectral resolution themselves and, typically, are slowly varying with wavelength. The manipulation performed by a SME 430 may be continuous with spatial position (said spatial position corresponding to different wavelengths) or spatially discrete. A physically large example of the former is a variable neutral density filter, such as Newport Research model 50G02AV.2 while an example of the latter could be a Dichroic Filter Array as produced by Ocean Optics Inc. of Dunedin, Fla. using technology under license of U.S. Pat. No. 5,711,889, Methodology to make optical filter arrays. Any of a large variety of SMEs may be used in the invention, and different numbers and types of SMEs may be mixed and matched in the invention while remaining within the intent of invention, which is to make a physically accessible region available in which individualized manipulation of the spectral components is possible.

Multiplexer Configuration

Figure 12:
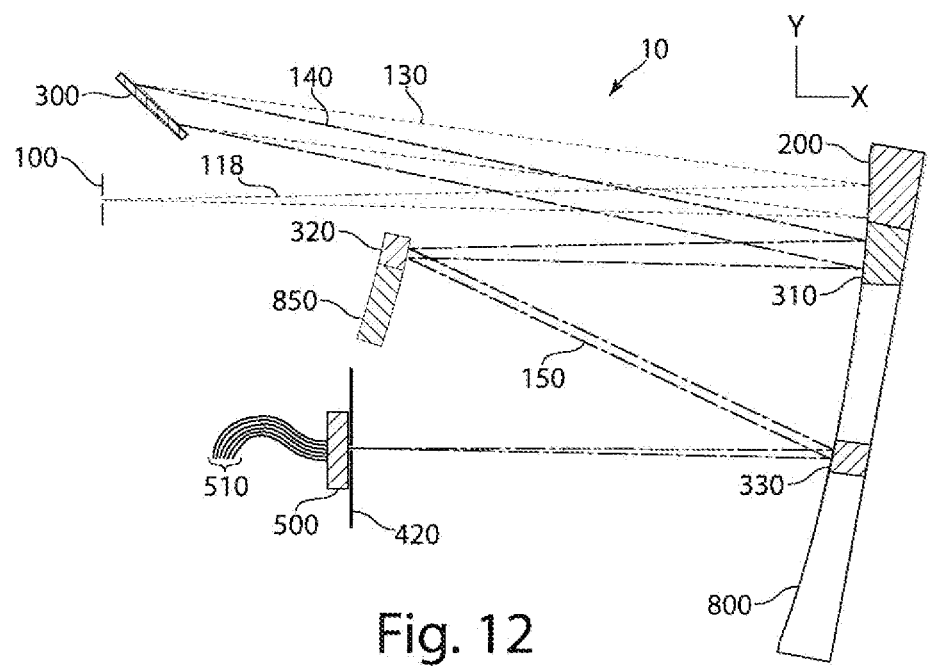
FIG. 12 presents a schematic view of the subject optical multiplexer/demultiplexer operating as a multiplexer; and, FIG. 13 is a schematic drawing of a multi-fiber v-block used to inject multispectral light into the multiplexer of FIG. 12.

Referring to FIG. 12, the multiplexer configuration is shown, here a third configuration for optical multiplexer/demultiplexer 80 is to reverse the functions of the input and output planes to create a means of multiplexing several individual light sources into a single, combined beam. The optical system for the multiplexer configuration, shown in FIG. 12, except for the elements in the input and output planes, is unchanged from the demultiplexer configuration shown in FIG. 4A. Former output plane 420 is, in this configuration, the location for one or more light sources, typically narrowband fiber lasers 510, held in a fiber positioning block 500. Each laser 510 is tuned to a unique wavelength within the dispersive range of grating 300. The source may alternatively be a semiconductor laser array with individual laser facets tuned to the appropriate laser wavelength. Former input plane 100, typically, is just a reference location through with the multiplexed beam will pass at focus.

For one preferred embodiment, grating 300 is operates at the $22^{nd}$ order in a near-Littrow configuration and, with the 2 mirror optical design, the angular dispersion of the grating is converted into a physical dispersion of 100 GHz/millimeter at output plane 420. Output plane 420 is approximately 50 millimeters wide, so the multiplexing range of this embodiment is approximately 5000 GHz.

Figure 13:
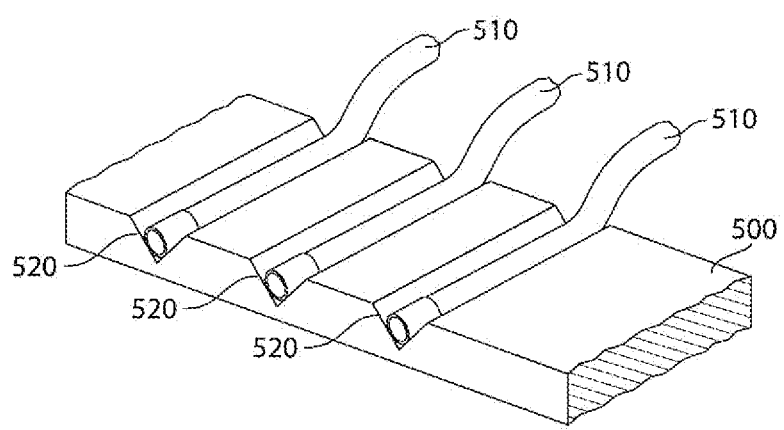

In a multiplexer, it is desirable to precisely overlap each of the input beams to obtain high output beam quality. To achieve said precision overlap, each input source is positioned precisely in former output plane 420. In a preferred embodiment as shown in FIG. 13, each source is an optical fiber 510 mounted in a v-channel 520 in positioning block 500, with the location of the v-channel for each fiber having been calculated specifically for the wavelength to which the source is tuned and the specific grating 300 and optical elements in the system.

Each fiber in positioning block 500 emits a cone of light 150. It will be understood that only one cone is illustrated for clarity but in operation there will be multiple, nearly parallel cones of light being emitted simultaneously. As illustrated in FIG. 12, the light in cone 150 propagates "backwards" through the optical multiplexer/demultiplexer, reflecting sequentially from region 330, region 320, region 310, grating 300, and region 200 before coming to focus in plane 100. At former input aperture 100 all of the cones of light that are emitted from block 500 are substantially overlapped to form a single output beam. An alternative embodiment takes advantage of the fact that the input laser beams are overlapped and coboresighted into a high quality collimated beam after diffracting from grating 300. This beam may be used as the free-space collimated output of the multiplexer if the grating 300 is oriented at an appropriate angle α such that the output beam clears optical element 800.

A preferred form of grating 300 is the echelle grating, in which a coarse-pitched grating is used at a high grating order to achieve large angular dispersion. The multiplexed outputs for all wavelengths of interest are preferably diffracted by the grating 300 into the same grating diffraction order, with the diffraction grating grooves blazed to maximize diffracted throughput into the utilized diffraction order. An alternative embodiment utilizes high-order echelle gratings with each of a number of discrete multiplexed wavelengths diffracted into a different diffraction order, all having maximum grating efficiency for a single grating blaze angle. Accordingly, in this alternative embodiment, all multiplexed wavelengths emerge into a common angular direction; each wavelength being diffracted at or near the peak efficiency of the blaze function for that discrete wavelength and diffracted order. The peak of the blaze function repeats with diffracted order and in this embodiment, each wavelength uses a different diffracted order. So, wavelength separations can be chosen such as to align with the peak diffraction efficiency of subsequent diffracted orders. For example, an echelle grating can be created such that the order separation corresponds to approximately 100 GHz in frequency or 0.8 nm in wavelength in the 1.5 micrometer wavelength region. Such a grating would provide peak diffraction efficiency at each discrete wavelength in the diffraction order in which it is used, sending all wavelengths into a common output angular direction. Another embodiment of grating 300 would be a multilayer dielectric interference grating, allowing high power laser output.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. An optical multiplexer/demultiplexer comprising:
a primary reflective optical element and a secondary reflective optical imaging element in combination with a diffraction grating operating in a near Littrow configuration, said primary reflective optical element being a single one-piece optical element segmented into a parabolic section at the periphery of said primary reflective optical element and a pair of adjacent aspheric sections, said combination concentrating in a demultiplexing operation a diverging incoming multispectral beam and collimating said concentrated diverging incoming multispectral beam towards said grating, said combination functioning as a telescope to take the diffracted light from said grating and focus said diffracted light towards an output plane such that beams of different colored light arrive in parallel at said output plane to establish telecentricity, said combination functioning in a multiplexing operation to take differently colored light beams arriving at said output plane, focusing said differently colored light beams onto said grating and collimating the refracted light from said grating into a single multispectral output beam.

2. The apparatus of claim 1, wherein the near Littrow operation is established by configuring said reflective optical elements such that the direction of the collimated multispectral beam direction is nearly identical to the direction of said diffracted light dispersed across a set of directions.

3. The apparatus of claim 1, wherein said reflective optical elements in combination serve as both the collimator and imaging optics for the multiplexer/demultiplexer.

4. The apparatus of claim 1, wherein said reflective optical elements have spherical reflective surfaces.

5. The apparatus of claim 1, wherein said optical elements have spherical reflective surfaces.

6. The apparatus of claim 1, wherein one section of said segmented primary reflective optical element reflects refracted light from the grating to said secondary reflective optical imaging element.

7. The apparatus of claim 6, wherein light from said secondary reflective optical imaging element is reflected from another section of said segmented optical element to said output plane.

8. The apparatus of claim 1, wherein said optical elements operate as an imager and as a telephoto lens having a physical back focal distance shorter than the focal length.

9. The apparatus of claim 1, and further including an optical processor at said output plane.

10. The apparatus of claim 9, wherein said processor individually processes multispectral light beams and injects processed multispectral light beams back into said apparatus, whereby said apparatus functions as a multiplexer to combine said processed beams into a single multispectral beam.

11. The apparatus of claim 1, and further including multiple differently colored laser beams projected through said apparatus to be combined into an output beam having a power which is the sum of the power of the input laser beams.

12. The apparatus of claim 11, wherein each of said laser beams is modulated, whereby the combined output beam includes the corresponding modulation.

13. The apparatus of claim 12, wherein said modulation is used in a countermeasure application.

* * * * *